No. 12,664. REISSUED JUNE 25, 1907.
I. KITSEE.
DUPLEXING TELEGRAPH LINES.
APPLICATION FILED MAY 25, 1907.
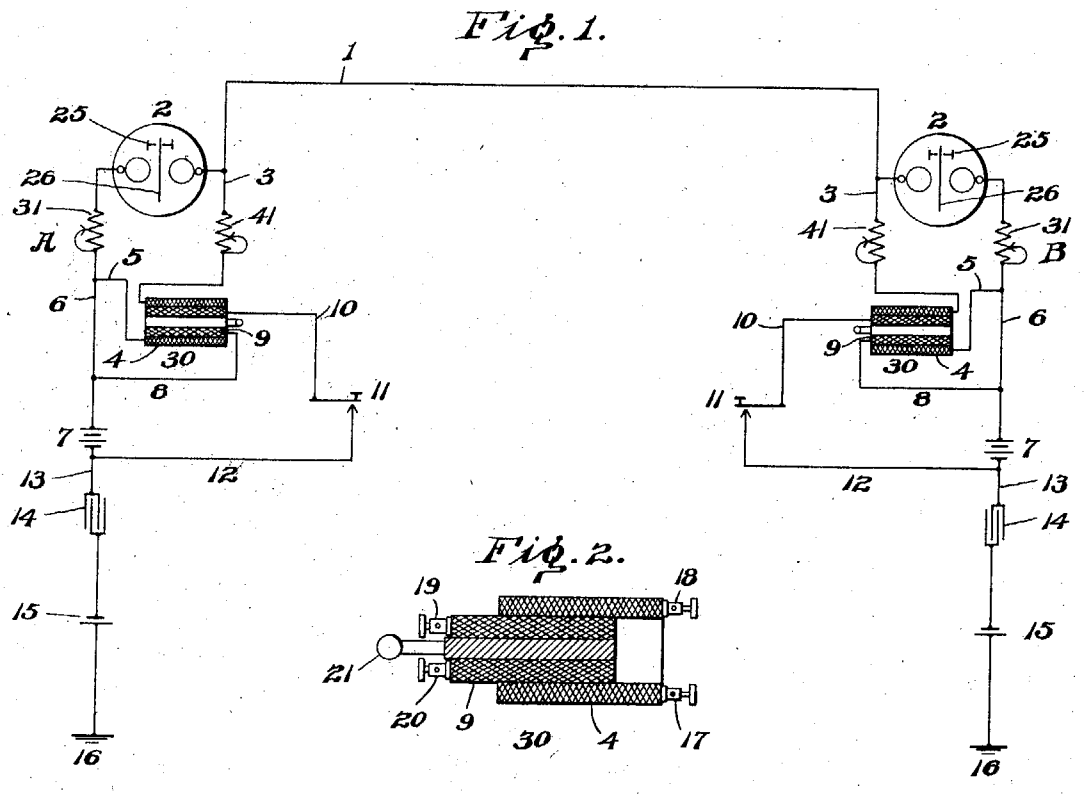
Witnesses
Daniel Webster, Jr.
Anna E. Steinbock
Inventor
Isidor Kitsee
By
Cornelius D. Ehret
his Attorney
THE NORRIS PETERS CO., WASHINGTON, D. C.

UNITED STATES PATENT OFFICE.

ISIDOR KITSEE, OF PHILADELPHIA, PENNSYLVANIA.

DUPLEXING TELEGRAPH-LINES.

No. 12,664. Specification of Reissued Letters Patent. Reissued June 25, 1907.

Original No. 850,305, dated April 16, 1907. Application for reissue filed May 25, 1907. Serial No. 375,749.

*To all whom it may concern:*

Be it known that I, ISIDOR KITSEE, a citizen of the United States, residing at Philadelphia, in the county of Philadelphia and State of Pennsylvania, have invented certain new and useful Improvements in Duplexing Telegraph-Lines, of which the following is a specification.

My invention relates to an improvement in duplexing telegraph-lines.

It has more special reference to lines with great capacity—such, for instance, as submarine or subterranean cables. It is well known that on such lines practical telegraphy with a straight or continuous current is out of the question, and currents of both polarities have to be employed to transmit messages if satisfactory speed in signaling is to be attained. On the submarine cable the double key is employed, one key adapted to impress a positive and one key adapted to impress a negative impulse on the line. It was found after careful experiments that it is advantageous to transmit with the aid of reversals—that is, impulses alternately of opposite polarity—and that if the impulses are only momentary and are always alike in duration and intensity the best results are obtained. Such system is called "true reversals", and this, my invention, is more especially adapted to such system.

On submarine cables an artificial cable is employed for each station if the cable should be duplexed, and the instruments are placed between a bridge joining the real with the artificial cable. This arrangement has its disadvantages. The artificial cable is very cumbersome and costly, and as the electric properties of the cable proper are always changing the condensing effect and resistance of the artificial line has also to be changed.

It is the aim of my invention to dispense with such artificial cable and to produce a system whereby telegraphic lines, even such as the submarine cable, may be duplexed with the aid of a simple local contrivance.

In the drawings, Figure 1 is a diagrammatic view of a telegraphic line connected to two stations embodying my invention. Fig. 2 is a sectional view of the device with the aid of which the duplexing is possible.

In Fig. 1, 1 is the line proper, provided with two stations A and B, each station comprising transmitting, duplexing, and receiving devices. The transmitting device comprises the two sources of current, here shown as the batteries 7 and 15. The battery 7 consists here of two cells and 15 of one cell, connected in opposition as to each other. I have illustrated the two sets of batteries to consist of two cells and one cell, respectively; but it is obvious that the number of cells may have to be increased to meet practical requirements. Between the two cells is here inserted the condenser 14. The source 7 is provided with the shunt comprising the wires 8 10 12 and the key 11. I do not now take into consideration the device 30, which I call the "duplexing" device, but will describe the manner in which true reversals may be transmitted over the cable.

When an operator desires to transmit messages, he depresses his key in the usual manner—that is, a short period for a dot and a longer period for a dash. Through the depression of the key the source 7 is short-circuited, and the electrical equilibrium of the line will be disturbed and an impulse will flow over the line in a direction according to the polarity of the predominating source. At each station is the polarized receivng device 2, here shown in conventional sign, and this device is provided with means 25 and 26 to control a local circuit containing a signal translating device. It is now supposed that the operator at A desires to transmit messages, and it is also supposed that in closing the key an impulse will flow over the line, bringing in contact at the station B the armature of the receiving device with the point connected to 25, thereby closing a local circuit, and it is supposed that when the operator A releases the key an impulse of opposite polarity will flow over the line, and this impulse will send the armature of 2 in the opposite direction—that is, away from the contact connected to 25. The impulses are, as is well understood by persons versed in the art, only momentary, because as soon as a condenser is charged it is an effectual bar to the flow of a voltaic or straight current. In transmitting dots or dashes the operator only sends over the line momentary impulses, an impulse of a like duration for the dot as well as for the dash, the difference of time unit between one impulse and the other impulse symbolizing the character to be sent. In transmitting a dot the operator closes the key for a short period and releases then the lever. The closing of the key sends an impulse of such a direction over the line, so as to close the local circuit at the receiving-station, and the opening of the key sends an impulse over the line in the opposite direction, therefore opening the local circuit containing the translating device at the receiving station. In other words, the closing time of the local circuit at the receiving-station will always coincide with the closing time of the key. The operator therefore manipulates his key in this system in the usual manner—that is, he holds the lever down for a short time to denote a dot and for a longer period to denote a dash. At the receiving-station the local circuit will be closed for a shorter period for a dot and for a longer period for a dash, just as is the case of ordinary Morse systems.

So far the system of true reversals was explained when the working is a simplex one; but when the line should work duplexed—that is, when messages shall be simultaneously transmitted from both ends over the line—it is necessary that the home instrument shall not respond to the impulses resulting from manipulation of the home key; but the receiving instrument at the far end should be free to respond to such impulses. For this reason I have recourse to the arrangement as is clearly indicated by the device 30. This device consists of an inductorium embracing the primary part (here designated by 9) and the secondary part, (here designated by 4,) the primary part provided with the connecting means 19 and 20 and the secondary part with the connecting means 17 and 18. The primary part is also provided with the means 21 (here illustrated as a handle) to move this primary either entirely into the region of the secondary or to move the same partially out of this region. I have placed the primary in the shunt between the wires 8 and 10. The secondary I have connected with the wires 3 and 5, and to these wires are connected the terminals of the receiving device 2.

The operation of this system is as follows: When the key is depressed, an impulse will flow over the line; but at the same time current from the battery 7 will flow through the shunt embracing the key it will also flow through the primary. An impulse will therefore be generated in the secondary. Simultaneously, therefore, two impulses will flow into the receiving device, one tending to move the armature in one direction and the other tending to move the armature in the opposite direction, and the influence of these two impulses on the device will therefore be *nil*. When the key is opened, an impulse will flow over the line in the opposte direction; but as at the time of the opening of the key the flow of the current through the primary 9 ceases an impulse will be induced in the secondary in direction opposite the former secondary impulse. As this secondary impulse will flow through the home receiving device in opposition to the line impulse then again the magnetizing effect of these two impulses will be neutralized, and the home instrument will remain silent; but as at the distant or receiving station the key remains open no impulse will flow through the shunt or the inductorium placed in the shunt, and therefore the instrument at the distant end will be free to respond to the transmitted impulses. When the operators at both stations depress the key, the impulses at both stations will neutralize each other. They will therefore not affect any instrument, and the respective instrument of each station will only be affected by the impulse generated in the secondary of the induction coil.

In practice it is best to place a variable resistance, as 41, in the circuit connecting the instrument 2 with the secondary 4, for the reason that the impulse transmitted from the far station should not pass through the secondary, but should pass in the greatest part through the receiving instrument proper.

I have described my method of duplexing in connection with the transmission of impulses with the aid of two sources of current inserted in the line of transmission, for the reason that with this system of transmission the advantage of this method of duplexing is more pronounced than with other systems of transmission; but it is obvious that other transmitting means may be substituted for the means shown and described.

Having now described my invention, what I claim as new, and desire to secure by Letters Patent, is—

1. In duplex telegraphy without artificial line, the combination with the line, of a receiving instrument having a single winding, and means for preventing response of the receiving instrument to current transmitted from the same station comprising an induction-coil, the secondary of said induction-coil connected to the winding of said receiving instrument, the primary including a source of energy and transmitting-key.

2. In duplex telegraphy, the combination with the line, of a receiving instrument having a single winding connected in series therewith and with a source of energy, an induction-coil having its secondary connected to said receiving instrument, and its primary including said source of energy and a key.

3. In duplex telegraphy, the combination with the line, of a receiving instrument having a single winding, an induction-coil having its secondary connected to said receiving instrument, its primary including a key and a source of current, and means for adjusting the mutual induction between said primary and secondary windings.

4. In duplex telegraphy without artificial line, the combination with the line, of a receiving instrument connected in series therewith, and in series with two oppositely-disposed sources of energy of different magnitudes, a shunt-circuit including one of said sources of energy, a key and the primary of an induction-coil, the secondary of said induction-coil connected to said receiving instrument.

5. In duplex telegraphy without artificial line, the combination with the line, of a receiving instrument connected in series therewith and with a condenser and with two sources of energy oppositely disposed and of different magnitudes, a shunt-circuit including one of said sources of energy, a key and the primary of an induction-coil, the secondary of said induction-coil being connected to said receiving instrument.

6. In duplex telegraphy without artificial line, the combination with the line, of a return-circuit, a receiving instrument, a source of energy, a condenser and another source of energy connected in series between said line and return circuit, said sources of energy being of different magnitudes, a circuit in shunt to one of said sources of energy and including a key and primary of an induction-coil, the secondary of said induction-coil being connected to said receiving instrument.

7. In duplex telegraphy, the combination with the line, of a receiving instrument, a transmitter for impressing upon the line successive impulses of approximately equal duration and opposite polarities, and means for rendering ineffective in the receiving instrument impulses transmitted from the same station.

8. In duplex telegraphy, the combination with the line, of a polarized receiving device, means for transmitting to line successive impulses of approximately equal duration and alternating in polarity, and an induction-coil associated with said transmitting means for rendering the receiving instrument unresponsive to impulses transmitted from the same station.

9. In duplex telegraphy, the combination with the line, of a receiving device having a single winding, means for transmitting to line impulses of different polarities, and an induction-coil associated with said transmitting means and having its secondary connected to the winding of said receiving instrument.

10. In duplex telegraphy, the combination with the line, of a polarized receiving device, means for transmitting to line impulses of different polarities, and an induction-coil associated with said transmitting means and having its secondary connected to the winding of said receiving device.

11. In duplex telegraphy, the combination with the line, of a receiving device, oppositely-disposed sources of energy, a shunt-circuit including only one of said sources of energy, and means controlled by said shunt-circuit for rendering said receiving instrument unresponsive to current transmitted from the same station.

12. In duplex telegraphy, the combination with the line, of a receiving instrument having a single winding, a plurality of sources of electrical energy, a circuit in shunt to one of said sources of energy, and means controlled by said circuit for delivering current to the winding of said receiving instrument to render it unresponsive to current transmitted from the same station.

13. In duplex telegraphy, the combination with the line, of a receiving instrument, a plurality of unequal sources of energy, a circuit in shunt to only one of said sources of energy and including the primary of an induction-coil, the secondary of said induction-coil being connected to said receiving instrument.

14. In duplex telegraphy, the combination with the line, of a receiving instrument, a plurality of sources of energy connected in series with the winding of said instrument, a circuit in shunt to only one of said sources, a key and the primary of an induction-coil included in said circuit, the secondary of said induction-coil connected to said receiving instrument.

15. In duplex telegraphy, the combination with the line, of a receiving instrument at each station, oppositely-disposed sources of energy at each station, a circuit in shunt to only one of said sources of energy, and means controlled by said circuit for rendering said receiving instrument unresponsive to current transmitted from the same station.

16. In duplex telegraphy, the combination with the line, of a receiving instrument, oppositely-disposed sources of energy, a condenser intervening between said sources, a circuit in shunt to one of said sources, and means controlled by said shunt-circuit for rendering said receiving instrument unresponsive to current transmitted from the same station.

17. In duplex telegraphy, the combination with the line, of a receiving instrument, oppositely-disposed sources of energy, a condenser intervening between said sources, a circuit in shunt to one of said sources and including the primary of an induction-coil, the secondary being connected to said receiving instrument.

18. In duplex telegraphy, the combination with the line, of a transmitter for impressing upon said line impulses of different polarities, a receiving instrument associated with said line, and means for impressing upon said receiving instrument impulses of opposite polarity to those transmitted to line.

19. In duplex telegraphy, the combination with the line, of a transmitter for impressing upon the line impulses of different polarities, a receiving instrument associated with said line, the winding of said receiving instrument being connected with the secondary of an induction-coil.

20. In duplex telegraphy, the combination with the line, of oppositely-disposed sources of energy, a circuit in shunt to one of said sources and including a key, a receiving instrument associated with said line, and means for rendering said receiving instrument unresponsive to current transmitted from the same station.

21. In duplex telegraphy, the combination with the line, of oppositely-disposed sources of energy, a condenser intervening between said sources, a circuit in shunt to one of said sources and including a key, a receiving instrument associated with said line, and means for rendering said receiving instrument unresponsive to current transmitted from the same station.

22. In duplex telegraphy, the combination with the line, means for transmitting to line impulses of different polarities, a receiving device having a single winding, and an induction-coil having its secondary connected with the winding of said receiving device, the primary and secondary windings of said induction-coil being adjustable with respect to each other.

23. In duplex telegraphy, the combination with the line, of a polarized receiving instrument, means for impressing upon the line impulses of different polarities, and an induction-coil having its secondary connected to said receiving instrument, the primary and secondary windings of said induction-coil being adjustable with respect to each other.

24. In duplex telegraphy, the combination with the line, of branched circuits, a branch circuit including a receiving instrument having a single winding, another branch including the secondary of an induction-coil, and means for transmitting to line impulses of different polarities and the primary of said induction-coil associated with said transmitting means.

25. In duplex telegraphy, the combination with the line, of branched circuits, a branch including a receiving instrument having a single winding, another branch including the secondary of an induction-coil, a source of energy associated with said line, and the primary of said induction-coil included in a circuit with said source of energy.

26. In duplex telegraphy, the combination with the line, of a receiving instrument, and secondary of an induction-coil connected in parallel, a current-limiting device in the circuit of said secondary, a source of energy associated with said line, and a circuit including said source of energy and the primary of said induction-coil.

27. In duplex telegraphy, the combination with the line, of a receiving instrument having a single winding, the secondary of an induction-coil connected in parallel therewith, a source of energy associated with said line, and a circuit including said source of energy and the primary of said induction-coil, the primary and secondary windings of said induction-coil being adjustable with respect to each other.

28. In duplex telegraphy, the combination with the line, of means for impressing upon said line impulses of different polarities, a polarized receiving instrument associated with said line and having a single winding, the secondary of an induction-coil connected to said receiving instrument the primary associated with said impressing means.

In testimony whereof I affix my signature in presence of two witnesses.

ISIDOR KITSEE.

Witnesses:

EDITH R. STILLEY,

MARY C. SMITH.